Feb. 16, 1971  JAMES E. WEBB  3,563,727
ADMINISTRATOR OF THE NATIONAL AERONAUTICS
AND SPACE ADMINISTRATION
METHOD AND APPARATUS FOR DISTILLATION OF LIQUIDS
Filed Jan. 11, 1968  2 Sheets-Sheet 1

INVENTORS
ALGERD BASIULIS
PAUL K. SHEFSIEK
BY
ATTORNEYS

INVENTORS
ALGERD BASIULIS
PAUL K. SHEFSIEK

United States Patent Office 3,563,727
Patented Feb. 16, 1971

3,563,727
METHOD AND APPARATUS FOR DISTALLATION OF LIQUIDS
James E. Webb, Administrator of the National Aeronautics and Space Administration, with respect to an invention of Algerd Basiulis, Redondo Beach, Calif., and Paul K. Shefsiek, Acton, Mass.
Filed Jan. 11, 1968, Ser. No. 697,075
Int. Cl. B01d *3/12;* C22b *9/04*
U.S. Cl. 75—63                      10 Claims

ABSTRACT OF THE DISCLOSURE

Method and apparatus for distillation of materials including liquid metals having at least one U-shaped tube with one upstream end connected to the device to which the purified metal is to be delivered. The material to be purified is disposed in the base of the U while the upstream leg is surrounded with cooling coils for condensation, and the downstream leg has heating coils at a portion thereof for vaporization. The bottom reservoir portion of the U is heated. Between the reservoir portion and the upstream leg of the U within the device is a capillary tube to carry the heated material from the reservoir to the heated region. A series of these tubes can be connected together in continuous fashion to produce a fractional distillation.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435.42 U.S.C. 2457).

BACKGROUND OF THE INVENTION

(1) Field of the invention

This invention relates to the purification of liquid materials. More particularly, the invention relates to a method and apparatus for effecting distillation of liquid materials including liquid metals, so as to obtain high purity product.

(2) Description of the prior art

Purification of metals is of increasing importance in today's technology. One of the most prominent areas of interest where the purity of metal is important is in the field of thermionic converters. In thermionic converts, vaporized or gaseous cesium is fed to the area between the emitter and collector. Cesium serves to form an ionized gas or plasma which neutralizes the electron space charge in the region between the emitter and collector, allowing the electrons to pass more readily therebetween. Such thermionic converters are operated under low pressure conditions. The liquid cesium normally is stored in a glass capsule which is broken immediately prior to operation of the converter. The cesium is heated so as to produce the desired vapor pressure in the region between the emitter and collector. In order to prevent cesium from being drawn off into the vacuum pump, a trap must be disposed in the vacuum line. Under this conventional arrangement, repeatability of conditions is extremely difficult, since the purity of the cesium can vary considerably from capsule to capsule.

The operation of the converter is extremely sensitive to impurities being present in the cesium vapor and thus one of the most severe limitations on the operation of the converters has been with regard to obtaining the necessary high purity. To overcome this, some has attempted to distill the cesium prior to it entering the converter. However, utilizing the conventional distillation technique, a portion of the cesium vapor would condense, drop back down to the liquid bath, and affect the overall vapor pressure so that a pulsing of the vapor would be achieved. This of course cannot be tolerated in a thermionic converter where essentially constant vapor pressure of cesium is mandatory. Such converters thus worked only on a pulsing basis which is not satisfactory. In addition to thermionic converter, the need for delivery of extremely pure metals at constant pressures is also required in the operation of heat pipes. In both the thermionic converter and the heat pipe, the requirement is for the delivery of a single metal in a purified form. Normally, the starting material utilized is that metal alone having some impurities therein which must be removed.

Another area with regard to the distillation of metals in which the prior art has encountered difficulties is in the separation of liquid metal having close boiling points, for example 5°–10° C. The prior art techniques for the separation of liquid metals through various techniques including distillation were complicated and extremely expensive and could not readily separate the metals having close boiling points.

Thus, it is an object of this invention to provide a method and device for the purification of liquid materials which can be readily utilized in combination with thermionic converters and heat pipes and like apparatus.

A further object of this invention is to provide method and device for the distillation of liquid metals to deliver a purified metal at a stable and controllable pressure, unaffected by temperature variations in the liquid metal pool.

Still another object of this invention is to provide a method and device for the distillation of materials having close boiling points.

SUMMARY OF THE INVENTION

The above and other objects of this invention are accomplished by a device and method utilizing essentially a U-shaped tube of a material that is compatible with the liquid material desired to be purified. It will be apparent that the invention can distill most any liquid material which will be susceptible to capillary action. However, it is in the field of distillation of liquid metals where the outstanding advance in the art is most notable. Thus, for purposes of discussion only, the description will be with reference to liquid metals. The metal to be purified resides in the base of the U which is surrounded by heating coils so as to control the temperature of the molten liquid metal bath. One leg or side of the tube will preferably be connected to a vacuum pump which serves to draw off the volatile impure material. That same leg of the tube is surrounded with cooling coils whereby the temperature of that leg can be carefully controlled so as to condense any of the metal vapor that might pass to the vacuum, so that it will fall back to the bath. For force of gravity thus causes the liquid to return to the pool in the bottom of the U. Extending from the pool upward into the other leg of the U is a suitable capillary structure which conveys the liquid by capillary action up into this leg of the device. The capillary structure can be referred to as a wick since it operates similar to one. It can be made, for example, of fine wire mesh which is tubular shaped and lies concentrically in and against the walls of the device. At the end portion of the capillary structure in the second leg of the U-shaped device of this invention there are heating coils surrounding the device. The heat at this point controlled to be sufficient to vaporize the liquid metal that has risen in the capillary structure, carrying it at a constant pressure into a thermionic converter or other suitable apparatus. It is important that the temperature here be higher than the temperature at the liquid metal pool in the bottom of the U, so as to effectively draw off the vapor. As can be seen, the advantage of this device is that there is always a constant temperature provided at the point where vaporization occurs, namely at the top of the capillary structure. The effect of any condensing metal cooling the pool at the bottom of the U-shaped tube is of virtually no consequence. In other devices, the return of continually condensing liquid to the heater pool pulses the vapor pressure of the vapors given off, thus prohibiting delivering such vapor at a constant pressure. Of course, any vapor that does not leave the device to go to the thermionic converter or other apparatus will pass around to the cooled condensing coils in the opposite leg, be condensed and return as a liquid to the pool in the bottom of the device. As previously indicated, vapor which does not condense at the selected temperature of the cooling coil will be removed from the device as an undesirable impurity. It should be appreciated that a series of these U's can be connected in a continuous pipe where, for example, there would be three U-tubes present. This construction of a distillation unit is very effective in the removal of hydrocarbons, oxides and hydrides. In such a device the condensing coils on the successive U-shaped tubes are of a lower temperature than the vaporization point on the preceding tube, with the liquid metal baths of each successive unit being progressively higher.

It is believed that the invention will be better understood from the following detailed description and drawings in which.

Figure 1:
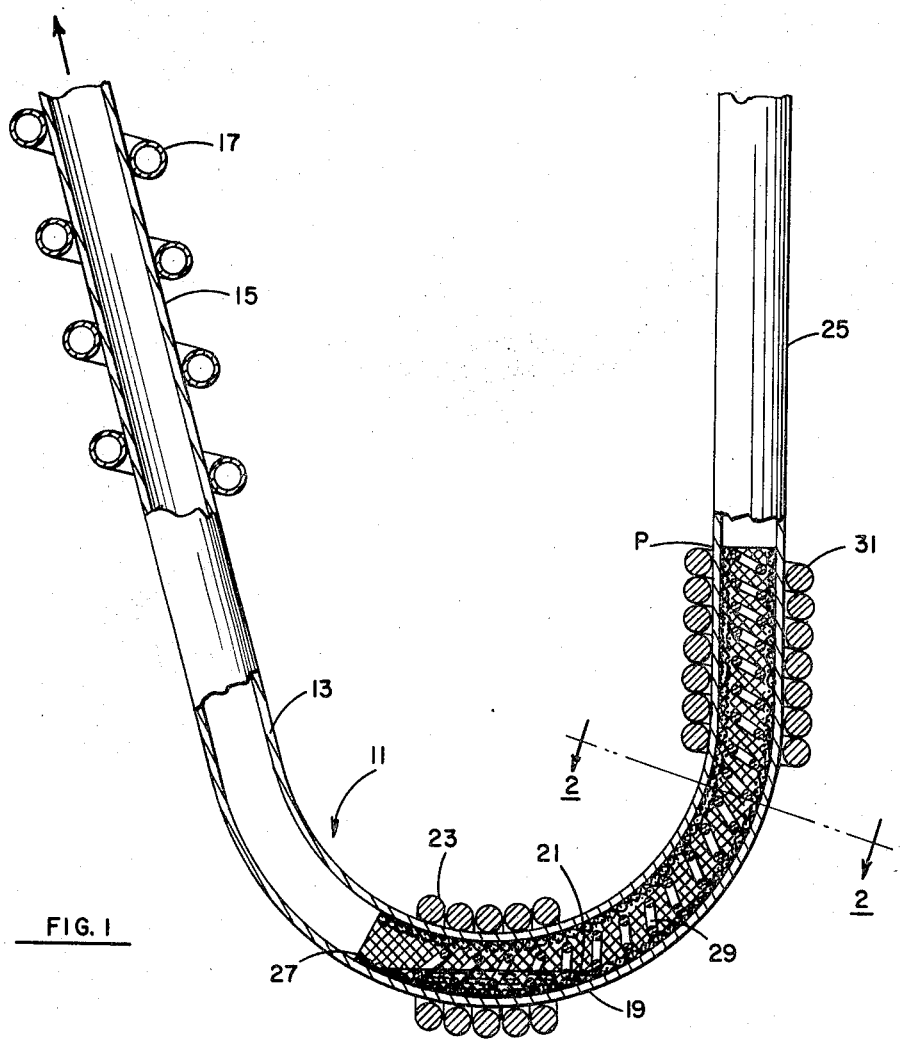
FIG. 1 is a partially sectioned view of a single U-shaped device for distillation of liquid materials in accord with this invention.
Figure 2:
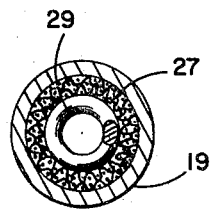
FIG. 2 is a cross-section taken along lines 2—2 of FIG. 1.

Turning now to FIGS. 1 and 2, there is seen a single generally U-shaped device 11 of this invention, which is comprised of a tube 13 of a material compatible with the liquid metal which is being distilled. For example, if the liquid metal is cesium, the tube could be comprised of stainless steel. The device 11 is comprised of an upstream leg 15 which is connected as indicated in the drawing to a vacuum pump whereby the volatile impurities can be withdrawn. Surrounding this leg are cooling coils 17 through which coolant at controlled temperatures can pass. It is noted that the leg 15 is not vertically disposed but is at a slight angle. The specific construction of the device is not overly critical as long as the general U-shaped configuration is obtained. The bottom portion 19 of the U contains therein a reservoir 21 of liquid metal. This bottom portion is surrounded by heating coils 23 which control the temperature of the reservoir of molten liquid metal 21. Extending from the bottom portion 19 upward into a second downstream leg 25 is a capillary tube 27 concentrically disposed within the device and adjacent the inner walls thereof. The capillary tube can be comprised of, for example, fine mesh stainless steel screen. The screen could be of a 400 mesh for example. It generally can be wound in from 3 to 10 layers, with three being shown in the cross section view of FIG. 2. After being wound into a tubular configuration having an outer diameter equivalent to the inner diameter of the device of the invention, the capillary tube is inserted in place as shown in FIG. 1. It is preferably held there and in contact with the walls of the tube by a retainer spring 29. Thus, in actually forming the capillary tube the layers are preferably wound about such a retainer spring prior to the insertion into the device. The capillary tube of wire as will be pointed out serves as a wick for carrying the molten liquid metal in bath 21 up into the second downstream leg 25 of the device. Obviously any porous material that will provide a capillary is sufficient, such as porous sintered metal, cloth, channels and other wick material ceramics.

Adjacent the top portion of the capillary tube 27 in leg 25 there are disposed about the leg on the outer surface of the device heating coils 31 which can controllably heat the liquid metal that has risen in the capillary tube. The top of the capillary tube 27 is designated as point P, and is where the liquid metal that has risen in the tube is converted to vapor in a manner that will be explained in further detail. Leg 25 can be suitably connected to a device which will be furnished with the purified material leaving the apparatus.

To explain the operation of the device, assume that the leg 25 is connected to a thermionic converter. In the converter the emitter temperature is assumed to be 1,350° C. and the collector at 700° C. At these temperatures, the cesium pressure is determined at 310° C. These are typical operating conditions for thermionic converters according to the state of the art. In operating such a converter, the converter is first turned on. Namely, the controls for the temperature of the emitter and collector establish their temperatures, and a vacuum in the converter to which it is attached. The next step is that the cooling through coils 17 begins. Normally water is circulated to achieve the desired cooling. A typical temperature of the coils is 75° C. Next, heating coils 31 are set to a temperature of 310° C. and the temperature at point P raised to that temperature. The heating coils 23 surrounding the bath 21 at the bottom of the device should be set to a temperature at least 10° C. below that of heating coils 31 to maintain a pressure differential. In other words, the ΔT between vaporization heating coils 31 and reservoir heating coils 23 should be such that vaporization coils 31 surrounding the top of the capillary tube 27 will determine the pressure of the system. Since the thermionic converter is operated at a temperature higher than that point P, an equilibrium occurs in which the liquid metal is evaporated from the capillary structure in the liquid metal pool 21. That vaporized metal which does not pass to the converter is condensed by the cooling coil 17 and returned to the liquid metal pool 21. The capillary structure 27 is being continually refilled by the liquid metal pool carrying the liquid metal to eventually point P where vaporization occurs. This process results in a pressure of metal vapor in the thermionic converter, or any other device with which the apparatus of this invention is utilized. The magnitude of the pressure of the metal vapor is determined by the evaporation rate of the liquid metal, the temperature and the diffusion rate of the liquid metal from the liquid pool to heated vaporization portion of the capillary. It can now be seen that point P is thermally isolated from the temperature variations in the liquid metal pool caused by the pulsating return of the liquid metal from the condensing coil 17 to the pool 21. Thus, point P is at a constant temperature enabling a stable vaporization rate which in turn provides constant pressure in a device with which the apparatus 11 of this invention is utilized.

When the thermionic converter is, for example, turned off, that is, the temperature lowered below that of pool heating coils 23, the purified cesium in the pool 21 will be transferred entirely to the converter. After all the cesium is transferred, it would be practical to seal off the cesium within the converter for later utilization. In normal operation the only cesium vapor that goes to the hot converter is that which is absorbed and fills the vacant area therein.

During the operation of the device 11 it should be apparent that impurities which vaporize below 75° C. will be withdrawn from the device. Impurities, if any, that do not vaporize at the temperature of point P, namely 310° C., will remain in the liquid pool 21. Thus, only pure cesium, for example, will pass into the thermionic converter or other device with which the apparatus of this invention is utilized. It should be pointed out that cesium is merely used as an example of one of the most prevalent materials in present utilization. The principle of this invention is applicable to other liquid metals such as lithium, sodium, potassium, rubidium, barium, strontium, lead, bismuth, indium and the like, as long as the construction of the apparatus in compatible with the liquid metal at the required distillation temperature. Additionally as indicated, the invention is applicable to any other fluids that have good surface tension including melted non-liquid metals, salt water, organic chemicals and the like.

Figure 3:
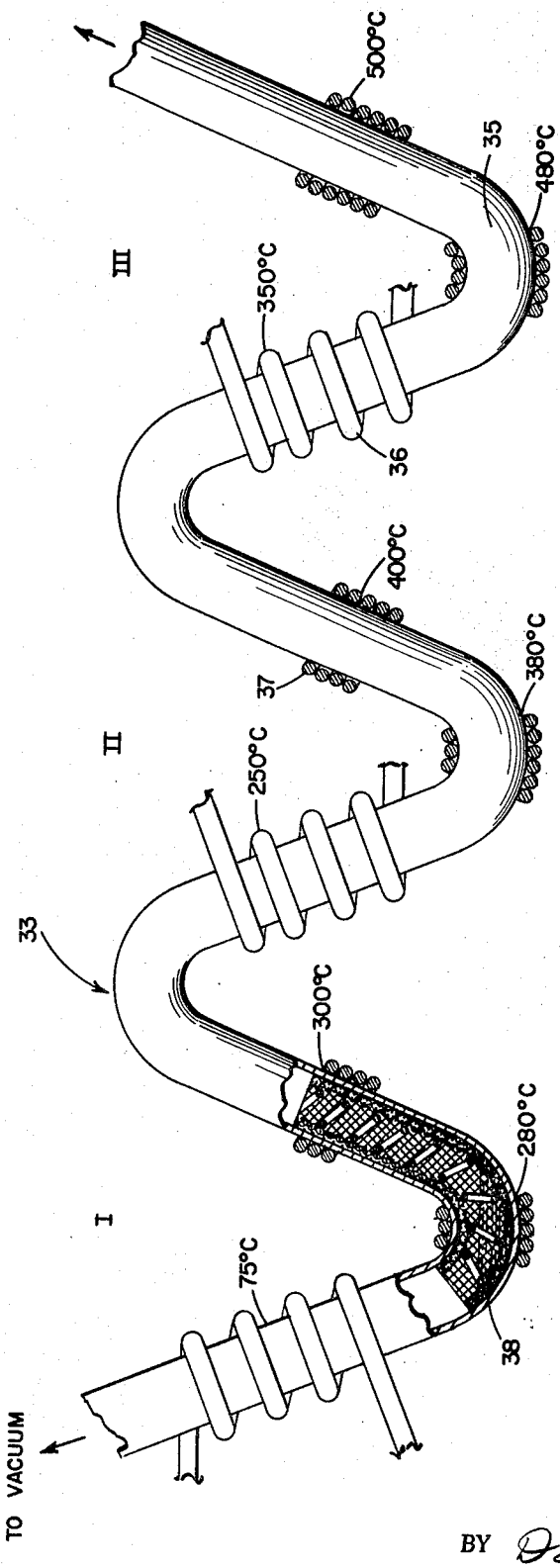
FIG. 3 is a partially sectioned pictorial view of a multi-unit for fractional distillation.

Turning now to FIG. 3, there is seen a device for fractional distillation which is actually a multi-unit device that would be quite effective for the removal of hydrocarbons, oxides and hydrides from metals such as cesium and the like. The three units indicated as I, II and III, are linked together in a continuous sinusoidal pipe 33 to form this fractional distillation apparatus. As seen in this multi-unit device unit III vaporizes the liquid metal at a temperature of 500° C. The bath at the bottom region 35 is maintained at a 20° differential so that its temperature is 480° C. The cooling coils 36 are shown at 350° C. These temperature conditions are particularly suitable for metals such as cesium, potassium and the like, and can trap in bath region 35 impurities which would vaporize at 400° C., the temperature of the vaporization region 37 of unit II, by condensing them with the cooling coils of 39 of unit III that are at 350°, thus passing only material which will vaporize at 500° C. It should be apparent that this configuration is required in order to achieve a step-up in temperature from Unit I to Unit III. Unit I has temperature conditions essentially similar to the single unit shown in FIG. 1. However, Unit I is only trapping in the bath material 38 which will condense at 75° C. Alternatively, in Unit III one cannot maintain the cooling coils there at such a temperature of 75° C. for practical reasons. Since the bath is at 480° C. it would be virtually impossible to maintain the region adjacent the reservoir 35 at such a significantly lower temperature. Thus, it is required that this be done in a step by step process where each unit has the cooling coil at a temperature of approximately 50° less than the heating coils in the vaporization region of the prior unit.

As can be appreciated, the multi unit device can be utilized for the separation of metals at close melting points. For example, as shown, Unit II has its vaporization coils 37 at 400° C. Thus a metal that has a vaporization point at temperature would pass on to Unit III and be condensed by the coils 36 which are maintained at 350° C. Trapped in the molten bath at 380° C. would be material that has a vaporization point in excess of the 400° C. temperature.

It should be apparent to those skilled in the art that the described method and apparatus are suitable for distillation of any liquids susceptible to capillary action, in other words, those having good surface tension. The specific conditions of distillation will of course, be determined by the liquid used. The material of construction and the capillary, particularly, will also be obviously chosen to be compatible with the starting compositions.

While the method and apparatus of this invention has been described and illustrated in detail, it is to be clearly understood that this is intended by way of illustration and example only and is not to be taken by way of limitation, the spirit and scope of this invention being limited only by the terms of the following claims.

What is claimed is:

1. A distillation device comprising:
   at least one hollow tubular structure having two legs extending upwardly from a common joinder base portion,
   means for controllably cooling a first leg of said structure,
   means for heating said base portion,
   capillary means within said tube extending from said base portion into the second leg, and
   means for controllable heating said second leg.

2. The device of claim 1 wherein said means for heating said base portion comprises heated coils surrounding the outer wall of said device at said portion.

3. The device of claim 1 wherein said cooling means comprises coolant coils surrounding the outer wall of said first leg at a portion thereof.

4. The device of claim 1 wherein said capillary means comprises a capillary wick fine mesh wire screen concentrically disposed against the inner walls of said device.

5. The device of claim 4 further comprising a coiled spring within said screen.

6. The device of claim 1 wherein said means for heating said second leg comprises heating coils surrounding said leg adjacent the termination of said capillary means therein.

7. The device of claim 1 comprising a plurality of said tubular structures connected in a continuous cycle.

8. A method for the fractional distillation of liquid materials comprising:
   providing a continuous hollow tubular device of substantially U-shaped structures connected together in a generally sinusoidal configuration,
   connecting an end of said device to a vacuum source, said end comprising an upstream leg of a first U-shaped structure,
   drawing substantially a vacuum on said device,
   providing a bath of material to be distilled in the base portion connecting the legs of said first structure,
   heating the base portion of each structure to progressively higher temperatures from said first structure,
   providing capillary means for causing the liquid to rise from the base of each structure to a downstream leg thereof,
   heating the downstream leg of each structure to effect vaporization of the liquid material in the capillary, and
   cooling the upstream leg of each structure to condense vapor passing therethrough.

9. The method of claim 8 comprising:
   heating the downstream leg of each successive structure to a progressively higher vaporization temperature.

10. The method of claim 8 wherein said liquid material is liquid metal.

References Cited

UNITED STATES PATENTS

| | | | |
|---|---|---|---|
| 1,514,151 | 11/1924 | Gerdien | 75—65 |
| 2,486,684 | 11/1949 | Schlesman et al. | 202—236X |
| 2,530,376 | 11/1950 | Castle et al. | 202—236X |
| 3,159,967 | 12/1964 | Webb | 75—66X |

ALLEN B. CURTIS, Primary Examiner

U.S. Cl. X.R.

75—93; 202—236; 203—89